US006859148B2

(12) United States Patent
Miller et al.

(10) Patent No.: US 6,859,148 B2
(45) Date of Patent: Feb. 22, 2005

(54) BLIND SPOT WARNING SYSTEM FOR AN AUTOMOTIVE VEHICLE

(75) Inventors: Ronald Hugh Miller, Saline, MI (US); Anya Lynn Tascillo, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,556

(22) Filed: Oct. 30, 2002

(65) Prior Publication Data

US 2004/0085196 A1 May 6, 2004

(51) Int. Cl.[7] ............................................. G08G 1/017
(52) U.S. Cl. ........................ 340/937; 340/937; 340/435
(58) Field of Search ................................. 340/937, 435, 340/436, 438, 903, 472, 901; 348/148; 382/104

(56) References Cited

U.S. PATENT DOCUMENTS

| 5,541,590 A | | 7/1996 | Nishio |
| 5,646,614 A | | 7/1997 | Abersfelder et al. |
| 5,680,123 A | * | 10/1997 | Lee ............................. 340/937 |
| 5,751,915 A | * | 5/1998 | Werbos ........................ 395/61 |
| 6,057,880 A | * | 5/2000 | Schnee ........................ 348/113 |
| 6,115,651 A | | 9/2000 | Cruz |
| 6,154,149 A | * | 11/2000 | Tyckowski et al. ......... 340/903 |
| 6,226,389 B1 | | 5/2001 | Lemelson et al. |
| 6,259,359 B1 | * | 7/2001 | Fujinami et al. ............. 340/435 |
| 6,424,272 B1 | * | 7/2002 | Gutta et al. ................. 340/937 |
| 2002/0005778 A1 | * | 1/2002 | Breed et al. ................. 340/435 |

* cited by examiner

Primary Examiner—Anh V. La
(74) Attorney, Agent, or Firm—Frank A. MacKenzie

(57) ABSTRACT

A warning system (12) for a source vehicle (10) is illustrated. A camera (20) generates a plurality of images. A controller (30) is coupled to an indicator (36). The controller (30) generates a size signal and position signal for a rear-approaching vehicle. The controller (30) activates an indicator when a rear-approaching vehicle enters a blind spot (14) in response to the size signal and position signal.

18 Claims, 3 Drawing Sheets

BLIND SPOT WARNING SYSTEM FOR AN AUTOMOTIVE VEHICLE

BACKGROUND OF INVENTION

The present invention relates generally to collision warning systems, and more particularly to a method and apparatus for warning a vehicle operator of another vehicle within a blind spot of the vehicle.

Collision warning systems are becoming more widely used. Collision warning systems provide a vehicle operator knowledge and awareness of objects or vehicles within a close proximity so as to prevent colliding with those objects. Current collision warning systems are unitary in nature in that they only warn the operator of the vehicle containing the collision warning system of a potential collision. A sensor located on a vehicle, upon sensing an object generates an object detection signal, which is communicated to the operator of that vehicle.

Warning systems for vehicles that are directed to the rear of the vehicle are known. However, such systems typically are not image-based and thus are subject to false sensing. Other rear-sensing systems monitor the rear of the vehicle without monitoring the transition of a vehicle from the rear of the vehicle to the blind spot.

Therefore, it would be desirable to provide an improved blind spot warning system. The improved system may increase reaction time and decrease the probability of a collision occurring.

SUMMARY OF INVENTION

Accordingly, an advantage of the present invention is to provide an improved blind spot warning system for use in an automotive vehicle.

In one aspect of the invention, a warning system for a source vehicle is illustrated. A camera generates a plurality of images. A controller is coupled to an indicator. The controller generates a size signal and position signal for a rear-approaching vehicle. The controller activates an indicator when a rear-approaching vehicle enters a blind spot in response to the size signal and position signal.

In a further aspect of the invention, a method of warning of a vehicle within a blind spot comprises: generating a plurality of images of an object; determining a size and a position of the object from the images; determining a transition of the object into the blind spot; and generating a warning when the object enters the blind spot.

Another advantage of the present invention is that it increases the reaction time for both operators of the target vehicle and the approaching vehicle. Thereby, decreasing the probability of a collision between the two vehicles.

Other advantages and features of the present invention will become apparent when viewed in light of the detailed description of the preferred embodiment when taken in conjunction with the attached drawings and appended claims.

DETAILED DESCRIPTION

Figure 1:
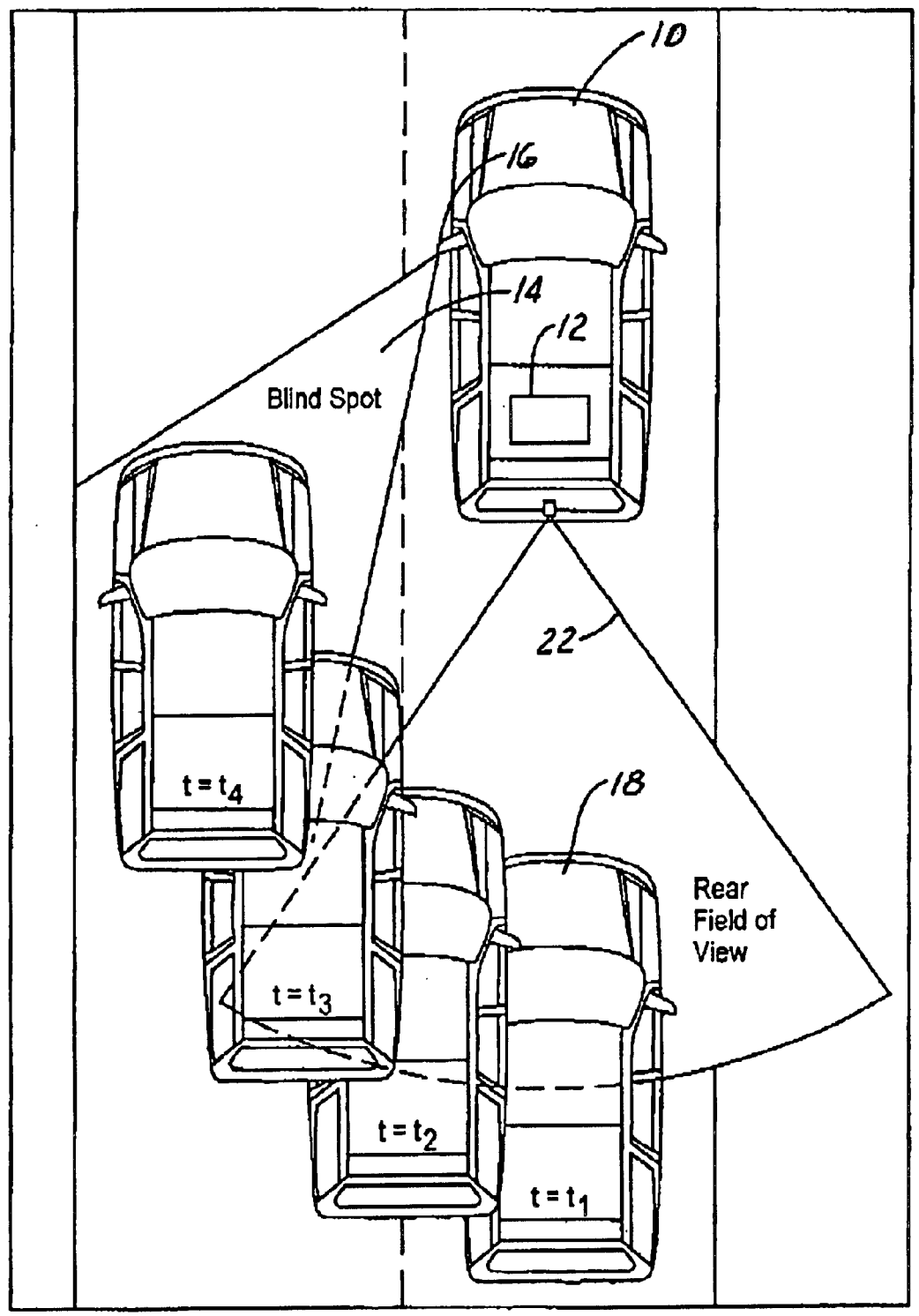
FIG. 1 is a top diagrammatic view of a source vehicle relative to four positions of a target vehicle.
Figure 2A:
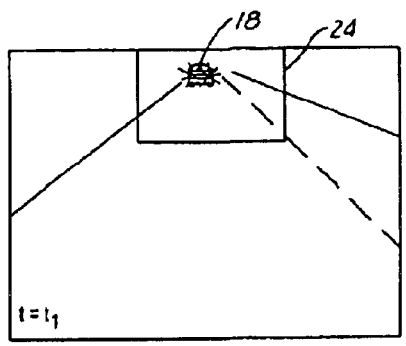
FIGS. 2A, 2B, 2C, and 2D are images from the camera of the source vehicle for the four positions of the target vehicle of FIG. 1.
Figure 2B:
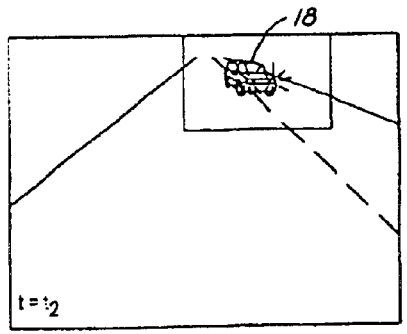
Figure 2C:
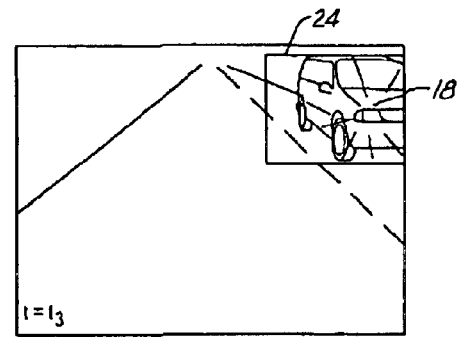
Figure 2D:
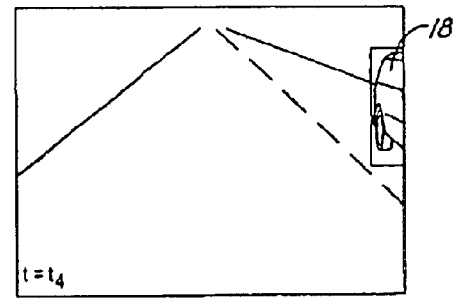

In the following figures the same reference numerals will be used to illustrate the same components. While the present invention is described with respect to a particular method and apparatus for blind spot warning, various adaptations may be evident to those skilled in the art.

Referring now to FIG. 1, a source vehicle 10 having a blind spot warning system 12 is illustrated. A representation of a blind spot 14 is illustrated. The blind spot 14 is the area beyond which the external driver side rear-view mirror 16 cannot see without glancing back. The blind spot 14 may be of many shapes and sizes depending on various factors such as mirror size and vehicle configuration. The blind spot warning system 12 provides an indication to the source vehicle operator as to the entering of a target vehicle 18 within blind spot 14.

Source vehicle 10 has a rear-facing camera 20 having a field of view 22. The field of view may not overlap or slightly overlap blind spot 14. Therefore, the present invention monitors the transition from the camera field of view to the blind spot 14. Camera 20 is preferably a low light camera. Today's technology allows a small camera to be placed inconspicuously on a rear panel 23 of the vehicle so as not to become aesthetically displeasing. Various locations on the rear of the vehicle including a trunk lid, a tailgate, the bumper, or the rear portion of the roof may all be desirable locations.

Target vehicle 18 is show in four locations proceeding from directly behind source vehicle 10 to approaching the source vehicle 10 on the passenger side and eventually entering into blind spot 14.

Referring now to FIGS. 2A, 2B, 2C, and 2D, the four positions of target vehicle of FIG. 1 are shown in perspective view progressing through a trajectory. An image box 24 is used to track target vehicle 18.

Figure 3:
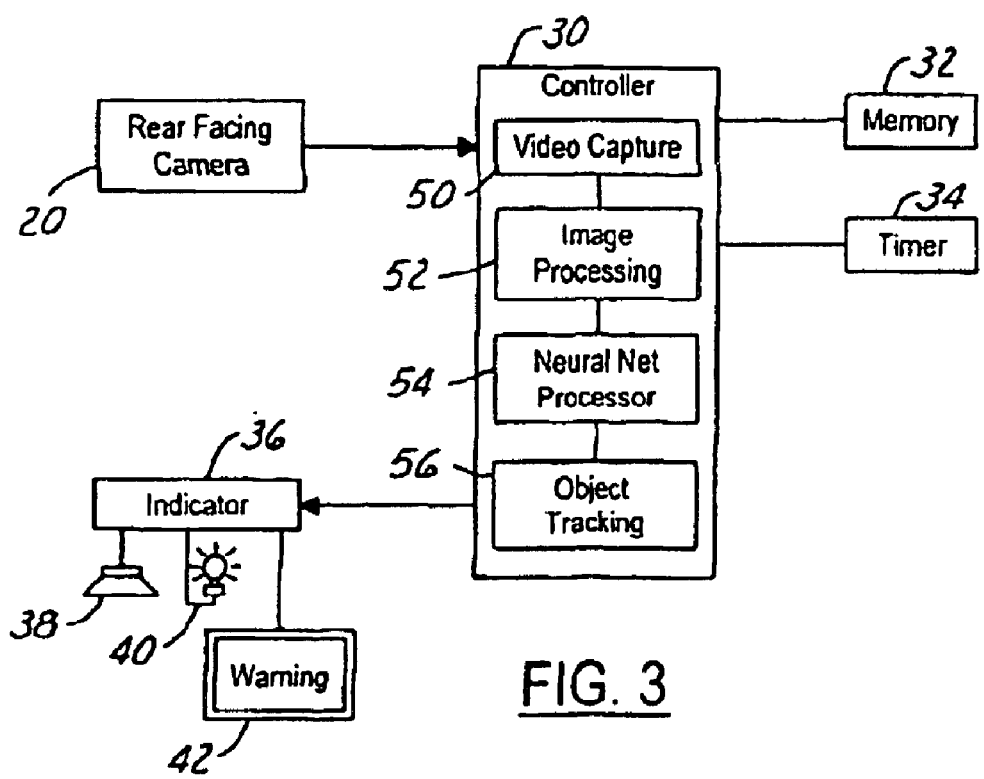
FIG. 3 is a schematic view of a blind spot warning system according to the present invention.

Referring now to FIG. 3, blind spot warning system 12 is illustrated in further detail. Blind spot warning system 12 includes a controller 30 that is coupled to the rear-facing camera 20 described above. Controller 30 is preferably a microprocessor-based controller having a central processing unit, internal memory such as RAM or ROM, and associated inputs and outputs communicating across a bus. Controller 30 may be a portion of a central vehicle main control unit or stand-alone unit.

Controller 30 is coupled to a memory 32 and a timer 34. Although memory 32 and timer 34 are illustrated as separate components in that of controller 30, both of these components may be incorporated into controller 30.

Memory 32 may comprise various types of memory Including read only memory (ROM), random access memory (RAM), electrically erasable programmable read only memory, and keep alive memory. Memory 32 is used to store various thresholds and parameters as will be further described below.

Timer 34 is a timer such as a clock timer of a central processing unit within controller 30. Timer 34 is capable of timing the duration of various events as well as counting up or counting down. For example, timer 34 may be used to time the progression of the trajectory of the target vehicle 18.

Controller 30 is coupled to an indicator 36. Indicator 36 may be one of a variety of types of indicators that may include an audible indicator or a visual indicator or a combination of both. Indicator 36 may include a speaker 38 to generate audible indications, a light bulb or LED 40 to provide visual indications, or a computer screen 42 such as that provided in navigation systems to generate various types of warnings. Indicator 36 may vary in intensity, amplitude, size, or in any way so as to communicate to the operator of source vehicle 10 the potential for colliding with target vehicle 18.

Controller 30 may include various processing which may be incorporated as separate devices or as an integral part of the controller. Controller 30 may, for example, include a video capture system 50, an image processing system 52, a neural net processor 54, and an object tracking system 56. Each of the systems 50-56 may be coupled together.

Video capture system 50 receives the information from camera 20 and forms a digital image thereof. Although the video capture system 50 is illustrated within controller 30, rear-facing camera 20 may also provide such information.

Image processing system 52 may be used to process the digital image. Various types of processing include the formation of an image box 24 illustrated in FIGS. 2A–2D. By monitoring the critical pixels in the image, other information such as the image size and trajectory may be determined. The image box 24 corresponds to the vehicle size.

Neural net processor 54 may be implemented in a single chip within controller 34. Neural net processor 54 receives the information from image processing system 52 and determines the presence of a vehicle within the blind spot or entering the blind spot. Based on the trajectory information, the track of the object, the increasing size of the object, the neural net processor 54 may be trained to recognize the potential for collision with a vehicle in the blind spot. Various types of systems are possible with various levels of neural net processors 54. At a minimum, the size and position of the target vehicle must be known.

Object tracking system 56 creates a temporal history of the object within the field of view in the memory. By knowing the temporal history the neural net processor 54 causes controller 30 to initiate an indication as to the presence of a vehicle within the blind spot as the target vehicle transitions into the blind spot.

Figure 4:
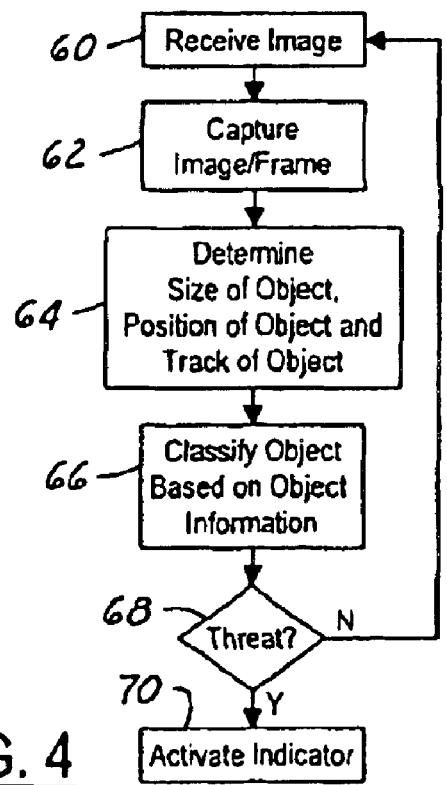
FIG. 4 is a flow chart of the operation of the blind spot warning system.

Referring now to FIG. 4, a method for operating the blind spot warning system 12 is described. In step 60, an image is received from the camera 20. In step 62 the image is captured, preferably for each frame. In step 64 the image is processed based on the position of the pixels therein. The system recognizes the position of the pixels and an object therein and determines various characteristics of the object such as the size of the object, the position of the object, and the track of the object (using the temporal history). Based upon the various types of characteristic information from the images, step 66 classifies the object based on the object information. By tracking the time and the change in size of the object, it is apparent that a vehicle approaching the rear of the vehicle will have an increasingly larger size and ultimately the track will track toward the blind spot. Based on the classification, a threat or potential threat is determined in step 68. If no threat is apparent such as the vehicle is not within the blind spot, step 60 is repeated. In step 68, if a threat is determined by the neural net processor 54, the indicator is activated in step 70. The indicator may include one or several of the different indicators described above.

Thus, by tracking the size and position the trajectory of the object such as a rear-approaching vehicle may easily be determined.

While particular embodiments of the invention have been shown and described, numerous variations and alternate embodiments will occur to those skilled in the art. Accordingly, it is intended that the invention be limited only in terms of the appended claims.

What is claimed is:

1. A warning system for a subject vehicle proximate a rear approaching vehicle comprising:

a rear-facing camera generating a plurality of images, said camera having a rear field of view adjacent to a blind spot;

an indicator;

a controller coupled to the indicator receiving the plurality of images, said controller generating a size and position signal for the rear approaching vehicle from the plurality of images, said controller activating an indicator when the rear approaching vehicle transitions into a blind spot from the rear field of view as determined in response to said size and position signal.

2. A system as recited in claim 1 wherein said camera has a rear field of view adjacent to and including a portion of the blind spot.

3. A system as recited in claim 1 wherein said camera comprises a low light camera.

4. A system as recited in claim 1 wherein said controller comprises a fuzzy neural network for classifying the object in response to the size and position signal.

5. A system as recited in claim 1 wherein said rear-facing camera is disposed on the rear of the vehicle.

6. A system as recited in claim 1 wherein said rear-facing camera is mounted to a rear panel of the subject vehicle.

7. A warning system for a blind spot of an automotive vehicle thereof comprising:

a rear-facing camera generating a plurality of images, said camera having a rear field of view adjacent to a blind spot;

an indicator; and a controller coupled to the indicator receiving the plurality of images, said controller generating a size, a position and a track for a rear approaching vehicle from the plurality of images, said controller activating an indicator when the rear approaching vehicle transitions into a blind spot from the rear field of view as determined in response to said size, track and position.

8. A system as recited in claim 7 wherein said camera has a rear field of view adjacent to the blind spot.

9. A system as recited in claim 7 wherein said camera comprises a low light camera.

10. A system as recited in claim 7 wherein said controller comprises a fuzzy neural network for classifying the object in response to the size and position signal.

11. A system as recited in claim 7 wherein said camera comprises a rear-facing camera.

12. A system as recited in claim 7 wherein said rear-facing camera is mounted to a rear panel.

13. A method of warning of a vehicle within a blind spot comprising:

generating a plurality of images of an object from a rear-facing camera having a rear field of view;

determining a size and a position of the abject from the plurality of images;

determining a transition of the object from the rear field of view into the blind spot; and generating a warning when the object enters the blind spot from the rear field of view in response to size of the object.

14. A method as recited in claim 13 further comprising determining a trajectory from the plurality of images of the object.

15. A method as recited in claim 13 wherein generating a plurality of images comprises generating a plurality of images from a camera.

16. A method as recited in claim 15 wherein said camera comprises a low light camera.

17. A method as recited in claim 13 wherein generating a warning comprises generating an audible warning.

18. A method as recited in claim 13 wherein generating a warning comprise; generating a visual warning.

* * * * *